(12) United States Patent
Meyer et al.

(10) Patent No.: US 11,983,895 B2
(45) Date of Patent: May 14, 2024

(54) METHOD AND DEVICE FOR DETERMINING AN EYE POSITION USING A LASER DEVICE FOR A SET OF SMART GLASSES AND LASER DEVICE

(71) Applicant: Robert Bosch GmbH, Stuttgart (DE)

(72) Inventors: Johannes Meyer, Magstadt (DE); Patrick Schlachter, Kirchentellinsfurt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/154,238

(22) Filed: Jan. 13, 2023

(65) Prior Publication Data
US 2023/0274457 A1  Aug. 31, 2023

(30) Foreign Application Priority Data
Feb. 28, 2022 (DE) ...................... 10 2022 202 000.6

(51) Int. Cl.
*G06T 7/70* (2017.01)
*G06F 3/01* (2006.01)

(52) U.S. Cl.
CPC ................ *G06T 7/70* (2017.01); *G06F 3/013* (2013.01); *G06T 2207/30201* (2013.01)

(58) Field of Classification Search
CPC ... G06F 3/013; G02B 27/017; G02B 27/0093; G06T 7/70; G06T 2207/30201
See application file for complete search history.

(56) References Cited

U.S. PATENT DOCUMENTS

| 10,394,034 B2 | 8/2019 | Reshidko et al. |
| 2014/0049750 A1* | 2/2014 | Grecu .................... A61B 3/113 351/210 |
| 2017/0115483 A1* | 4/2017 | Aleem ................. G02B 26/101 |

* cited by examiner

*Primary Examiner* — Deeprose Subedi
(74) *Attorney, Agent, or Firm* — NORTON ROSE FULBRIGHT US LLP; Gerard A. Messina (57) ABSTRACT

A method for determining an eye position using a laser device for a set of smart glasses. The method includes emitting light for scanning an eye along at least one scan line; detecting a plurality of reflection beams of the light reflected along the scan line in order to obtain a plurality of light intensity values, the light intensity values representing intensities of the reflection beams; generating a two-dimensional image of the eye along the scan line using the light intensity values, a high light intensity value being assigned or being assignable to a reflection beam reflected at the retina and a light intensity value low in comparison to the high intensity value being assigned or being assignable to a reflection beam reflected outside the retina of the eye; and determining the eye position of the eye within the image using amplitudes of the light intensity values.

15 Claims, 7 Drawing Sheets

METHOD AND DEVICE FOR DETERMINING AN EYE POSITION USING A LASER DEVICE FOR A SET OF SMART GLASSES AND LASER DEVICE

CROSS REFERENCE

The present application claims the benefit under 35 U.S.C. § 119 of German Patent Application No. DE 10 2022 202 000.6 filed on Feb. 28, 2022, which is expressly incorporated herein by reference in its entirety.

FIELD

The present invention is directed to a method and to a device for determining an eye position using a laser device for a set of smart glasses and to a laser device. The present invention also relates to a computer program.

BACKGROUND INFORMATION

The development of smart glasses is becoming increasingly important, particularly in view of the advancements in digitalization. In order to enable a user a best possible and comfortable experience, it is necessary to continue to develop smart glasses and the technology associated therewith as well as their functions.

U.S. Pat. No. 10,394,034 B2 describes an eye detection device including an infrared light source and a microelectromechanical system, which includes a mirror element.

SUMMARY

A method and a device for determining an eye position using a laser device for a set of smart glasses, a laser device and finally a corresponding computer program is provided according to the present invention. Advantageous refinements of and improvements on the device and method disclosed herein are possible with the measures disclosed herein.

The present invention provides a possibility of focusing an image generated for a user of a set of smart glasses using an eye position. In addition, the present invention may enable a control of the smart glasses, for example, via a human machine interface, as well as an image projection based on the eye position, for example, a dynamic switch from so-called eye boxes or foveated rendering. An eye box in this case refers to a display area in which the eye is able to perceive an image so that, for example, the image projection may also be controlled based on a view vector.

According to an example embodiment of the present invention, a method is provided for determining an eye position using a laser device for a set of smart glasses, which includes a step of emitting, a step of detecting, a step of generating, and a step of determining. In the step of emitting, light is emitted for scanning an eye along at least one scan line. In the step of detecting, a plurality of reflection beams of the light reflected at the eye along the scan line are detected in order to obtain a plurality of light intensity values, the light intensity values representing intensities of the reflection beams reflected along the scan line. In the step of generating, an image of the eye is generated along the scan line using the light intensity values, a high light intensity value being assigned or being assignable to a reflection beam reflected at the retina of the eye and a light intensity value low in comparison to the high light intensity value being assigned or being assignable to a reflection beam reflected outside the retina of the eye. In the step of determining, the eye position of the eye within the image is determined using amplitudes of the light intensity values.

The laser device may be implemented, for example, as part of a set of smart glasses, so that the method may be advantageously carried out during operation of the smart glasses. The light may be output, for example, as a laser beam guided along a row or column. The reflection beams in this case may be detected by a detection sensor. Gray scales may be advantageously detected by the light intensity values and additionally or alternatively recognized, which may be advantageously further processed within the scope of the method. The greater the difference is between the light intensity values, the greater may also be the contrast of the image. A variable of a light intensity value may correspond to a measured amplitude of the optical power of the corresponding reflection beam. A distinction may be made between a high light intensity value assignable to the retina and a low light intensity value not assignable to the retina using a threshold value preset or adapted to an instantaneous situation. The eye position may represent or include as information a pupil center and additionally or alternatively a pupil size of the eye, so that the image in the area of the eye position is able to advantageously be perceived by the user as focused. More precisely, the image sharpness may be improved in such a way as to also increase a customer satisfaction, for example.

When the image is further processed, for example, by applying a transformation, filtering or a different function, a correspondingly further processed image may replace the image, and thus, may be used in further method steps of the method. The quality of the method may be improved upon by a single or staggered suitable further processing of the original image.

According to one specific embodiment of the present invention, the light may be output in the step of outputting for scanning the eye along the scan line, which represents a row of the image generated in the step of generating. In other words, this means that the light may be output in a row-like manner. This may be advantageously carried out using a laser scanner.

According to an example embodiment of the present invention, the method may include a step of transforming the image using a function in order to obtain a transformed image with transformed light intensity values. As a result, the eye position may be determined in the step of determining using amplitudes of the transformed light intensity values. The transformed image may thus be used in further method steps instead of the previously mentioned image. The transformation of the image may advantageously represent a filtering out of gray scales, so that image contrasts may be heightened and thus the eye position may be better determined. The amplitudes may represent, for example, the light intensity values that lie above a first threshold value and additionally or alternatively below a second threshold value. This may advantageously improve the image contrasts.

According to one specific embodiment of the present invention, the step of transforming may be carried out using a Gaussian function, a step function or a rectangular function. The Gaussian function is advantageously applied in the step of transforming, since it may favor a filtering out of the gray scales while taking static properties of the reflection beams into account. A coordinate-true mapping of the image and a pupil signal may be achieved by the step of transforming. A low power consumption may further be achieved as the result of a low computational complexity of the algorithm.

Furthermore, according to an example embodiment of the present invention, the light may be emitted in the step of emitting along a plurality of scan lines. In the step of detecting, the plurality of reflection beams of light reflected at the eye along the plurality of scan lines may be detected in order to obtain the plurality of light intensity values, the light intensity values representing intensities of the reflection beams reflected along the plurality of scan lines. Furthermore, the image may be generated in the step of generating a two-dimensional map of the eye along the plurality of scan lines using the light intensity values and, in the step of determining, the eye position of the eye within the image may be determined using amplitudes of the light intensity values. The individual scan lines of the plurality of scan lines may, for example, be situated diagonally relative to one another, so that they may be situated in a zigzag manner and thus the eye may be scanned in a zigzag manner. The step of determining in this case may be advantageously carried out using a previously scanned scan line, while a next scan line is already being scanned. Computing time may be advantageously saved as a result.

According to one specific embodiment of the present invention, the light may be emitted in the step of emitting along a single scan line. The method may include a step of predetermining, in which an eye position value of the eye within the image may be determined using amplitudes of the light intensity values. The steps of the method may be carried out repeatedly for further scan lines in order to predetermine further eye position values. In the step of determining, the eye position of the eye may be determined using the plurality of eye position values. This means that the image is advantageously able to be iteratively fitted, in that eye position values may be predetermined row-by-row as output values and ultimately be used in the step of determining. In this case as well, the light may be advantageously guided in a zigzag manner across the eye in order to scan the eye.

Furthermore, according to an example embodiment of the present invention, individual image moments may be determined in the step of determining using the light intensity values, from the image moments, an image focal point of the image and from the image focal point, a position of a pupil center of a pupil of the eye being able to be determined as the eye position. This means that the light intensity values may be assigned to individual image moments such as, for example, to pixels or image points. In this way, the focus of the image may be advantageously sharpened using at least one mathematical formula via which the pupil center may be computed. The pupil center and, for example, a pupil diameter may further be advantageously determined directly from a so-called speckle image.

In the step of determining, a covariance matrix of the image may further be determined from the image moments and thus a pupil size of the pupil from the covariance matrix. In this way, the pupil size may be advantageously calculated.

According to one specific embodiment of the present invention, the covariance matrix may be used in the step of determining to determine a quality of the determination of the eye position. When using the covariance matrix, for example, a 1 may correspond to a perfectly round and thus fitted pupil, so that based thereon, the quality may be determined depending on to what extent a deviation therefrom is recognized.

Using the covariance matrix, it is possible to determine a movement of the eye. A movement of the pupil during the generation of an image of the eye may result in a distortion of the mapping of the pupil in the image. Parameters of such a distortion may be ascertained using the covariance matrix and may be used for determining the movement of the pupil. For example, the pupil may be mapped as an ellipse. Major axes of the ellipse may be ascertained from the covariance matrix and may be used for determining the movement of the pupil. In this way, it is possible to determine a direction and additionally or alternatively a quantitative variable of a velocity of the movement.

In addition, the image may be generated in the step of generating as a sub-image along a section of the scan line, the section being defined using a previously determined eye position. This means that the sub-image may be generated, for example, as an image section and thus as a sub-image of the image, for example, row-by-row. By generating the image in this manner, it is advantageously possible to dispense with a subsequent processing or altering of the image. The computing effort may thereby be reduced. In addition to a drastic reduction in the data that are recorded, the scanning of a photodiode in the laser as well as the laser may also be switched off for the areas in which no image is to be recorded. One further advantage is the minimization of an infrared exposure to the required minimum.

According to an example embodiment of the present invention, in the step of detecting, the reflected reflection beams of the light may be detected using a sensor, which is situated in the axis of the light emitted in the step of emitting or is folded into the axis. For example, a beam splitter may be used to fold the sensor into the path of the light.

This method may be implemented, for example, in software or hardware or in a mixed form of software and hardware, for example, in a control unit.

The present invention further provides a device, which is designed to carry out, activate or implement the steps of a variant of a method presented herein in corresponding units. With this embodiment variant of the approach in the form of a device as well, it is possible to quickly and efficiently achieve the object underlying the approach.

For this purpose, according to an example embodiment of the present invention, the device may include at least one processing unit for processing signals or data, at least one memory unit for storing signals or data, at least one interface to a sensor or to an actuator for reading in sensor signals from the sensor or for outputting data signals or control signals to the actuator and/or at least one communication interface for reading in or outputting data, which are embedded in a communication protocol. The processing unit may, for example, be a signal processor, a microcontroller or the like, the memory unit being capable of being a flash memory, an EEPROM or a magnetic memory unit. The communication interface may be designed to read in or output data wirelessly and/or in a hardwired manner, a communication interface, which is able to read in or output hardwired data, being capable, for example, of reading in these data electrically or optically from a corresponding data transmission line or outputting these data into a corresponding data transmission line.

A device in the present case may be understood to mean an electrical device which processes sensor signals and, as a function thereof, outputs control signals and/or data signals. The device may include an interface, which may be designed in hardware and/or in software. In a hardware design, the interfaces may, for example, be part of a so-called system ASIC, which contains a wide variety of functions of the device. It is also possible, however, for the interfaces to be separate, integrated circuits or to be made up at least partly of discrete components. In a software design, the interfaces may be software modules, which are present, for example, on a microcontroller alongside other software modules.

Another advantage according to an example embodiment of the present invention is a computer program product or computer program having program code, which may be stored on a machine-readable medium or memory medium, such as a semiconductor memory, a hard disk memory or an optical memory, and which is used for carrying out, implementing and/or activating the steps of the method according to one of the above-described specific embodiments, in particular, when the program product or program is executed on a computer or on a device.

According to an example embodiment of the present invention, a laser device for a set of smart glasses is further provided, the laser device including a light source for emitting light for scanning an eye along at least one scan line and a sensor for detecting a plurality of reflection beams of the light reflected at the eye along the scan line in order to obtain a plurality of light intensity values. The light intensity values in this case represent intensities of the reflection beams reflected along the scan line in order to generate an image of the eye along the scan line using the light intensity values. A high light intensity value is hereby assigned or assignable to a reflection beam reflected at the retina and a light intensity value low in comparison to the high light intensity value is assigned or is assignable to the reflection beam reflected outside the retina of the eye. Furthermore, an eye position of the eye within the image is determined using amplitudes of the light intensity values. The laser device further includes a device in a previously mentioned variant.

The laser device may be advantageously implemented as part of a set of smart glasses. The device may, for example, be implemented as, or function as, a control unit. Using the laser device, it is possible to advantageously control an image projection based on a view vector such as, for example, a vergence correction, so that virtual objects may be represented in space based on depths of view, for example. The sensor may be implemented as a laser feedback interferometry sensor, so that a stray light robustness may be improved. Moreover, by using the laser device, the light may be invisible for a user or wearer of the smart glasses. An integratability into an RGB laser scanner is advantageously possible.

BRIEF DESCRIPTION OF THE DRAWINGS

Exemplary embodiments of the present invention are represented in the figures and explained in greater detail in the description below.

DETAILED DESCRIPTION OF EXAMPLE EMBODIMENTS

In the following description of preferred exemplary embodiments of the present invention, identical or similar reference numerals are used for elements which are represented in the various figures and act similarly, a repeated description of these elements being omitted.

Figure 1:
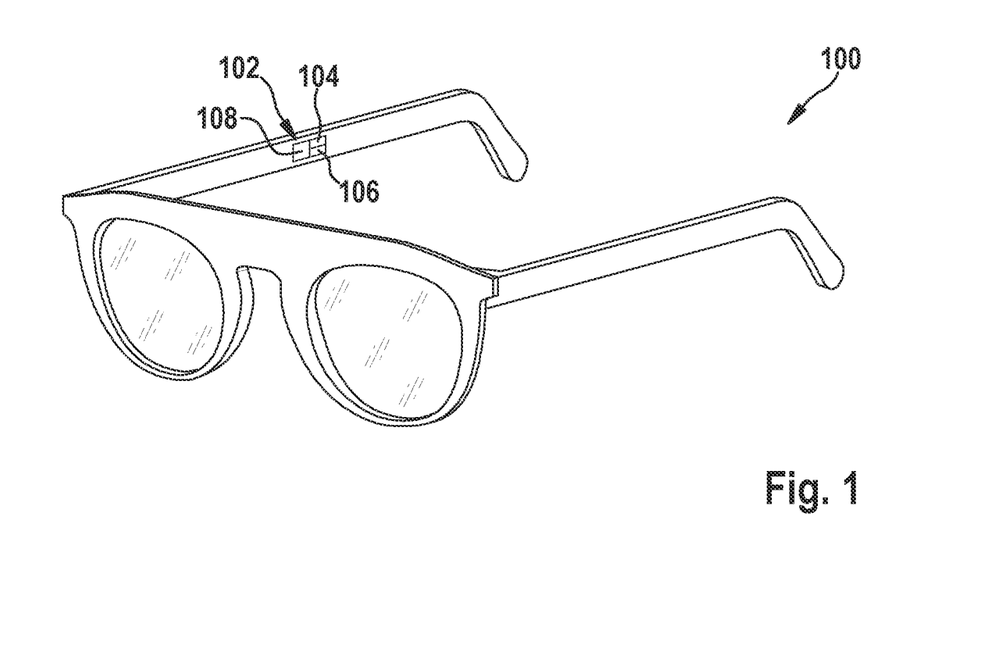
FIG. 1 schematically shows a representation of a set of smart glasses including a laser device according to one exemplary embodiment of the present invention.

FIG. 1 schematically shows a representation of a set of smart glasses 100 including a laser device 102 according one exemplary embodiment. Laser device 102 includes, for example, a light source 104 for emitting light for scanning an eye along at least one scan line and a sensor 106 for detecting a plurality of reflection beams of the light reflected at the eye along the scan line in order to obtain a plurality of light intensity values.

The light intensity values in this case represent intensities of the reflection beams reflected along the scan line in order to generate an image of the eye along the scan line using the light intensity values and in order to determine an eye position of the eye within the image using amplitudes of the light intensity values. Furthermore, a high light intensity value is assigned to or is assignable to a reflection beam reflected at the retina of the eye and a light intensity value low in comparison to the high intensity value being assigned or being assignable to a reflection beam reflected outside the retina of the eye. Laser device 102 also includes a device 108, which is designed to carry out or activate a method for determining the eye position.

For example, light source 104 is designed to output the light for scanning an eye successively along adjoining straight scan lines.

In this way, the entire eye or a relevant section of the eye may be scanned. The corresponding method is described in greater detail with reference to the following figures.

According to one exemplary embodiment, laser device 102 is designed to determine the eye position and thus, for example, a view vector in a head-worn set of smart glasses 100 by using the method.

In order for the measuring method to function, sensor 106 according to one exemplary embodiment serving as a detection sensor is situated in the axis of the light beam, typically a laser beam, emitted by light source 104. This may be implemented, in particular, by using a laser feedback interferometer (LFI sensor) with a photodiode integrated into the back reflector of the laser, the laser itself being used for the illumination, i.e., as light source 104, and the photodiode in the back reflector for receiving, i.e., as sensor 106. Alternatively, a photodetector may also be folded into the laser path via a so-called beam splitter, which is an alternative specific embodiment.

Figure 2:
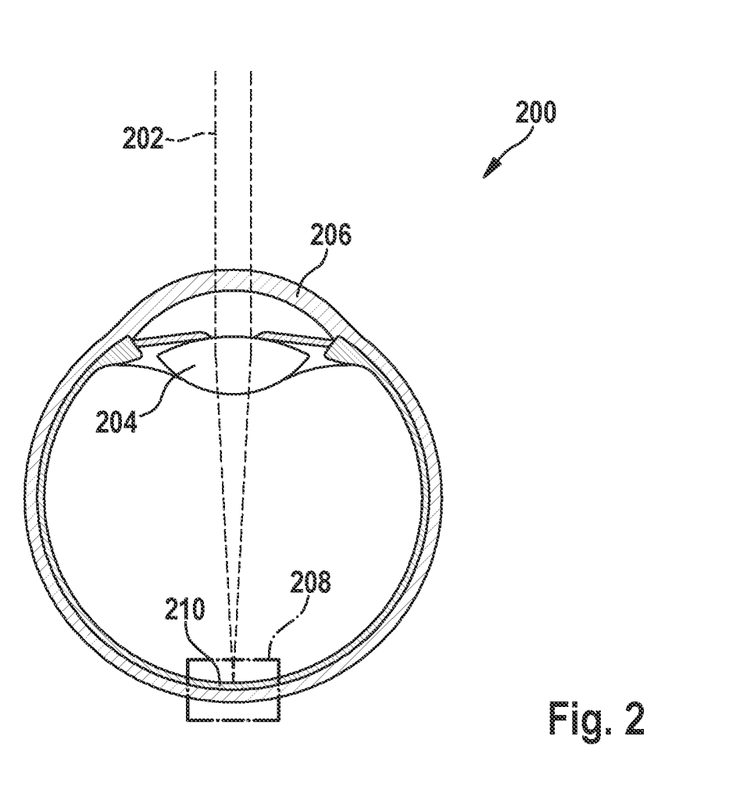
FIG. 2 schematically shows a sectional view of an eye including a beam path of light.

FIG. 2 schematically shows a sectional view of an eye 200 including a beam path of light 202. Light 202 in this case penetrates cornea 204 of eye 200, which is also referred to as the cornea, and according to this exemplary embodiment strikes lens 206 of eye 200, which generally focuses light 202 making it incident on a point in a posterior eye portion 208 of eye 200.

Figure 3:
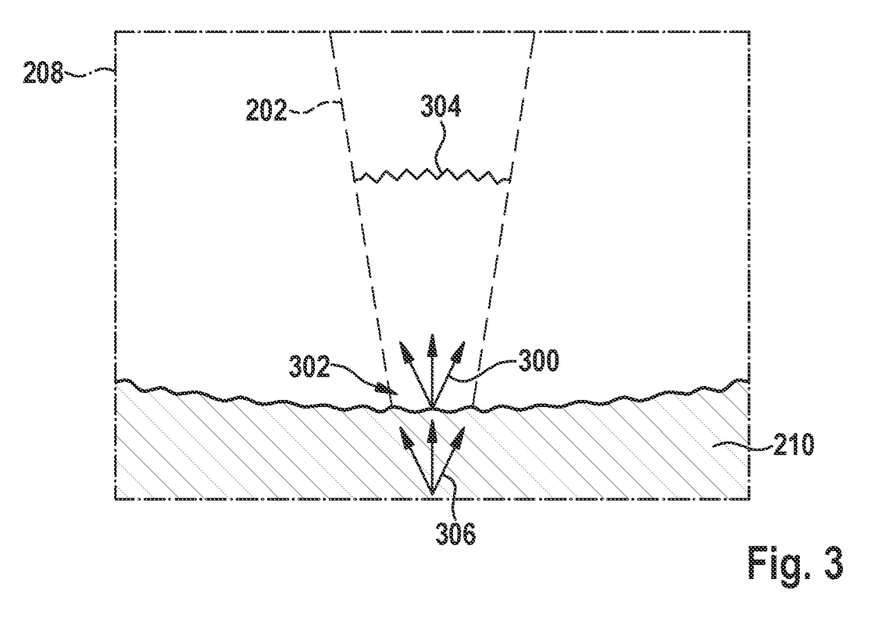
FIG. 3 schematically shows a representation of an enlarged eye section according to one exemplary embodiment of the present invention.

Eye portion 208 is enlarged in FIG. 3 and is described there in greater detail. Furthermore, retina 210 of eye 200 is situated in eye portion 208 on which lens 204 focuses light 202. Light 202 is on the whole better reflected at retina 210 than at other areas of eye 200.

Against this background, eye 200 is scanned with the aid of the laser device, which includes, for example, a laser feedback interferometry sensor (LFI) and an interference signal is observed in order to determine the position of the pupil. This means in other words that light reflected at eye 200 is detected by the sensor with the aid of at least one reflection beam and used to determine an eye position. Light 202 in this case is merely optionally scanned across eye 200 using a MEMS micro-mirror. A sinusoidal scan path is preferably used in the process, which represents a plurality of row-by-row scan lines as they are described, for example, in FIG. 4. During the scanning process, an optical power of a light source, for example, of a laser, is continuously sampled by a photodiode integrated into a back reflector of a semiconductor component. If light 202 strikes retina 210, for example, this results in a strong backscatter, since the reflectivity of retina 210 is stronger than that of the other components of eye 200 such as, for example, the iris or the sclera, so that a red eye effect is utilized. This results in an amplitude modulation of the optical power for eye portion 208 in that light 202 through the pupil is mapped on retina 210.

FIG. 3 schematically shows a representation of an enlarged eye portion 208 according to one exemplary embodiment. Eye portion 208 corresponds, for example, to eye portion 208 described in FIG. 2. Here, for example, the amplitude modulation mentioned in FIG. 2 is schematically mapped, in which the amplitude, or a light intensity, of at least one reflection beam 300, more precisely, of a plurality 302 of reflection beams 300 of the backscattered light, is modulated by speckling. In this case, an optical roughness of the retina 210 is utilized. The roughness of retina 210 is related in this case to the anatomy of the eye and behaves similarly for all humans. According to this exemplary embodiment, it is shown how light 202 behaves when it strikes retina 210.

As also described in FIG. 2, light 202 passes through the cornea and is initially focused by the lens onto retina 210. There, light 202 strikes the surface of retina 210 with its coherent wave front. A portion of the incoming wave front is reflected directly by the surface of retina 210, a wave front 304 of reflection beams 300 in this case being distorted by the signal propagation times through the rough surface of retina 210. A further portion of light 202 enters into the upper tissue layers of retina 210 from where it is reflected. Further reflection beams 306 of the further portion are accordingly also distorted and result in a distorted further wave front. These two effects result in a constructive or destructive interference in the LFI sensor, so that a light granulation or laser granulation, which are also referred to as "bright" and "dark" speckle, form in a normally distributed manner in the area of retina 210 and thus of the pupil in a generated image. These effects are utilized in order to ascertain a particularly efficient algorithm for determining the position of the pupil from the scanned image.

Figure 4:
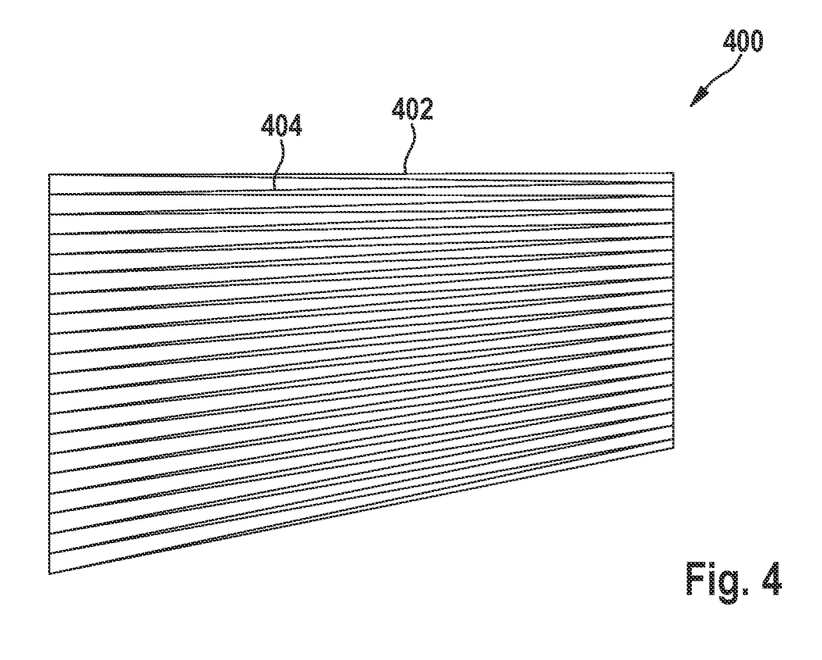
FIG. 4 schematically shows a representation of a plurality of scan lines according to one exemplary embodiment of the present invention FIG. 5 schematically shows a representation of one exemplary embodiment of the present invention of an image.

FIG. 4 schematically shows a representation of a plurality 400 of scan lines 402 according to one exemplary embodiment. Plurality 400 of scan lines 402 in this case includes at least scan line 402 and a further scan line 404, which are situated diagonally relative to one another. Scan lines 402, 404 according to this exemplary embodiment are situated in a zigzag manner relative to one another and represent a scan path of the light. This means that the light is also output in a zigzag manner, so that it follows scan lines 402, 404 in order to scan the eye, in order, for example, to generate an image. For example, the image is implementable in a two-dimensional manner. It is further possible to create sub-images row-by-row, which combined result in the image as a map of the eye.

Figure 5:
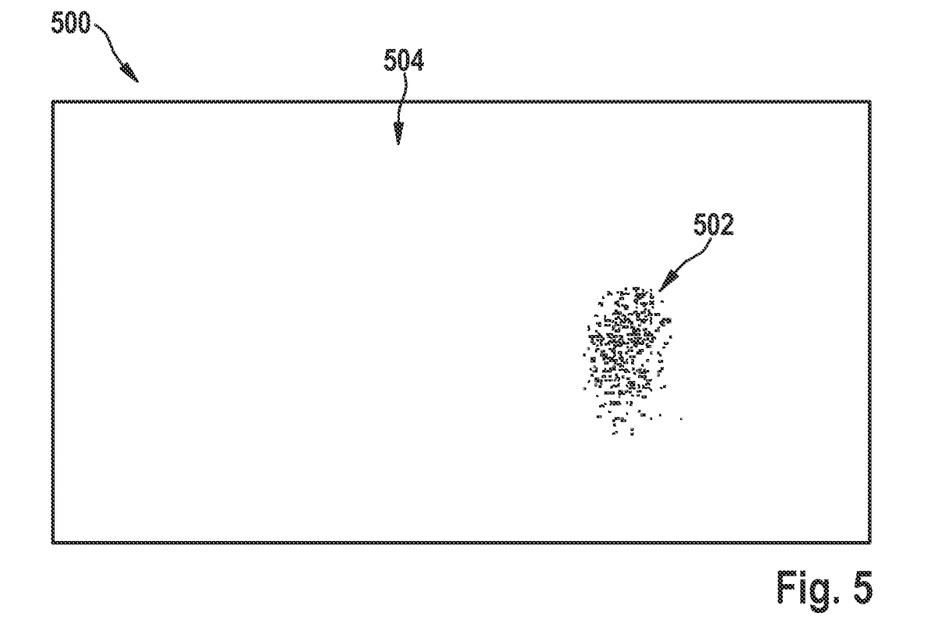

FIG. 5 schematically shows a representation of one exemplary embodiment of an image 500. Image 500 corresponds to a map of the eye as it has been generated, for example, using the reflection beams described in FIG. 3. Image 500 has been generated, for example, with the aid of a laser device of a set of smart glasses, as it has been described in FIG. 1.

According to this exemplary embodiment, image 500 includes an area 502, which contrasts in its brightness from its surroundings 504. Since image 500 has been generated using different light intensity values of the reflection beams and the reflection in the area of the retina of the eye is better than at other components of the eye, it is assumed that the one position of the retina corresponds to area 502. According to this exemplary embodiment, image 500 corresponds to an unprocessed raw image, which is only optionally further processed in order, for example, to emphasize contrasts and in this way to more accurately determine the eye position. Thus, in order to isolate a signal contribution of the pupil in the total signal, a section of a histogram is initially selected for example from image 500.

According to this exemplary embodiment, image 500 is represented as a raw signal of the amplitude signal of the sensor for a two-dimensional scan across the eye. Area 502 in this case represents the position of the pupil. As a result of the higher reflectivity (red eye effect) of the retina, the measured amplitude of the optical power contrasts in the amplitude, i.e., for example, a level of pixel values, with the rest of the image, which corresponds to surroundings 504. Thus, for example, merely optionally, the corresponding signal contribution is separated from the remaining signal via a histogram transformation.

Figure 6:
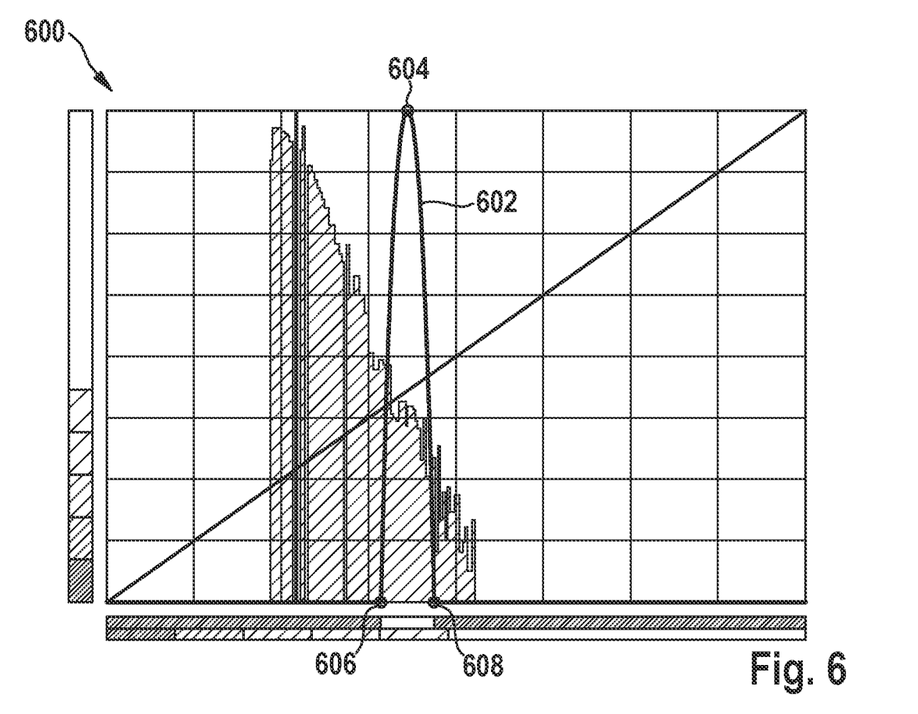
FIG. 6 schematically shows a diagram illustration of one exemplary embodiment of the present invention of a histogram.

FIG. 6 schematically shows a diagram illustration of one exemplary embodiment of a histogram 600. The histogram is similar, for example, to histogram 600 mentioned in FIG. 5.

According to this exemplary embodiment, a Gaussian curve 602, for example, is also represented. Gaussian curve 602, for example, should be meaningfully applied for the separation in histogram 600, since this simplifies the separation of the signals while taking their statistical properties into account such as, for example, a normal distribution of speckle amplitudes.

The curve in this case may be described via its peak 604, its left zero point 606 and via its right zero point 608. This Gaussian function is fitted once, for example, as part of a calibration. For this purpose, curve 602 with a width b having a step width of at least one is shifted across histogram 600 and a focal point (cx, cy) of the pixels is calculated. Once the change of the focal point falls below a defined threshold, for example, pixels, a histogram transformation function for the user is calibrated. In addition to a Gaussian function, arbitrary other functions such as, for example, a step function or a rectangular function, are also usable. Furthermore, width b of the histogram transformation function is optionally also calibratable, iteration taking place initially from a large b to a smaller value for b. The image after the transformation is represented by way of example in FIG. 7.

Figure 7:
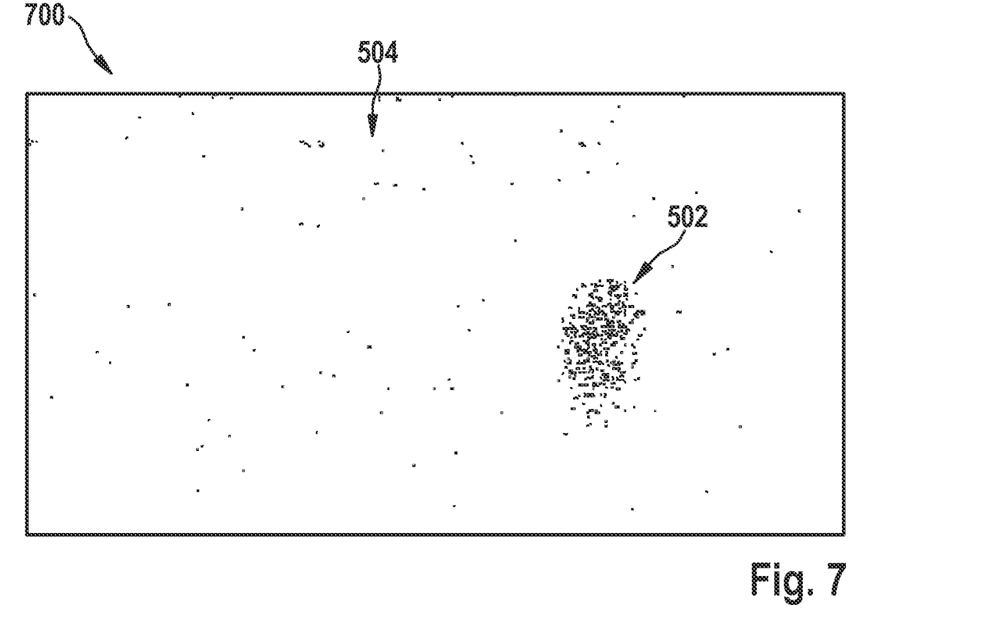
FIG. 7 schematically shows a representation of one exemplary embodiment of the present invention of a transformed image.

FIG. 7 schematically shows a representation of one exemplary embodiment of a transformed image 700. Transformed image 700 is similar, for example, to the image described in FIG. 5 with the exception that gray scales have been filtered out. This means that the transformation as it has been described, for example, in FIG. 6 based on the histogram, effects a greater contrast between area 502 and surroundings 504 in image 700. In other words, the speckle pattern, which is mapped from the retina across the pupil, is largely isolated from the rest of image 700.

In order to determine the pupil center and the pupil size, a mathematical function is fitted onto image 700, for example, a multivariate Gaussian distribution, The multivariate Gaussian function adequately describes the shape of the pupil (ellipsis/circle) and in the process takes into account the underlying physical operating principle, a so-called normally distributed speckling. Further functions used are circles and ellipses or rectangular functions. For the fitting of the Gaussian function, first and second order image moments are initially determined. The image moments may be determined in general by $$M_{ij} = \sum_x \sum_y x^i y^j I(x, y)$$

From moments M10, M01, and M00, the image focal point, $$\{\bar{x}, \bar{y}\} = \left\{\frac{M_{10}}{M_{00}}, \frac{M_{01}}{M_{00}}\right\}$$

the midpoint of the Gaussian distribution and thus the pupil center are subsequently determined. The covariance matrix of image 700 is subsequently determined from the second order moments M20, M02, M11, and M00.

$$\mu'_{20} = \mu_{20}/\mu_{00} = M_{20}/M_{00} - \bar{x}^2$$
$$\mu'_{02} = \mu_{02}/\mu_{00} = M_{02}/M_{00} - \bar{y}^2$$
$$\mu'_{11} = \mu_{11}/\mu_{00} = M_{11}/M_{00} - \bar{x}\bar{y}$$

and $$\text{cov}[I(x, y)] = \begin{bmatrix} \mu'_{20} & \mu'_{11} \\ \mu'_{11} & \mu'_{02} \end{bmatrix}$$

The main components of the covariance matrix p'20 and p'02 correspond in this case to the variance and thus to the length of the main axes of the Gaussian function. The length of the main axes further corresponds to the diameter of the pupil. Since the pupil is circular, an expression for the quality of the pupil detection is thus determinable from the quotient p'20 and p'02, 1 corresponding to a perfectly round and $$fx(x_1, \ldots, x_k) = \frac{\exp\left(-\frac{1}{2}(x-\mu)^T \sum^{-1}(x-\mu)\right)}{\sqrt{(2\pi)^k |\sum|}}$$

and thus perfectly fitted pupil. Based on this quality, it is thus possible to influence the control of the image projection of the smart glasses. For the fitting of the Gaussian function, the general description of the multivariate Gaussian distribution as an optimization function is used. For the fitting process, for example, a formulation of the smallest square of the error is used.

Figure 8:
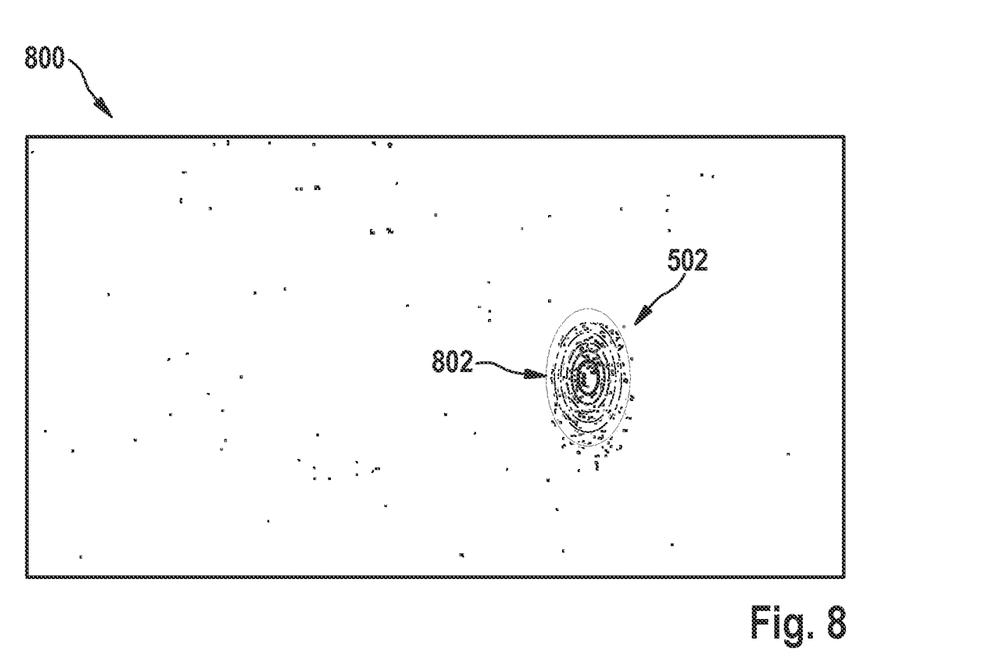
FIG. 8 schematically shows a representation of one exemplary embodiment of the present invention of an image.

FIG. 8 schematically shows a representation of one exemplary embodiment of an image 500. Image 500 represented here is similar, for example, to the image described in one of FIG. 5 or 7. According to this exemplary embodiment, a fitted 2-dimensional Gaussian function over the histogram-corrected image, as it has been described as a transformed image in FIG. 7, is represented as a contour plot. According to this exemplary embodiment, rings 802 are accordingly placed over area 502, which illustrate this. By using the Gaussian function, the robustness is improved when only a portion of the pupil is visible, when, for example, the eye at least partially leaves the scan area, since the Gaussian function is also determinable from a few sampling points.

In addition to the so-called iterative fitting of the function, the multivariate Gaussian function may also be calculated directly from the raw data for reducing the computing power, which correspond, for example, to the image described in FIG. 5. The image moments may also be calculated in parallel. The iterative row-by-row calculation of the required image moments or pixels is also possible for reducing the memory requirement.

Thus, according to this exemplary embodiment, an exemplary implementation of the calculation of the pupil midpoint and of the pupil diameter in digital logic is represented, for example, of a field programmable gate array (FPGA) or of an application-specific integrated circuit (ASIC).

Figure 9:
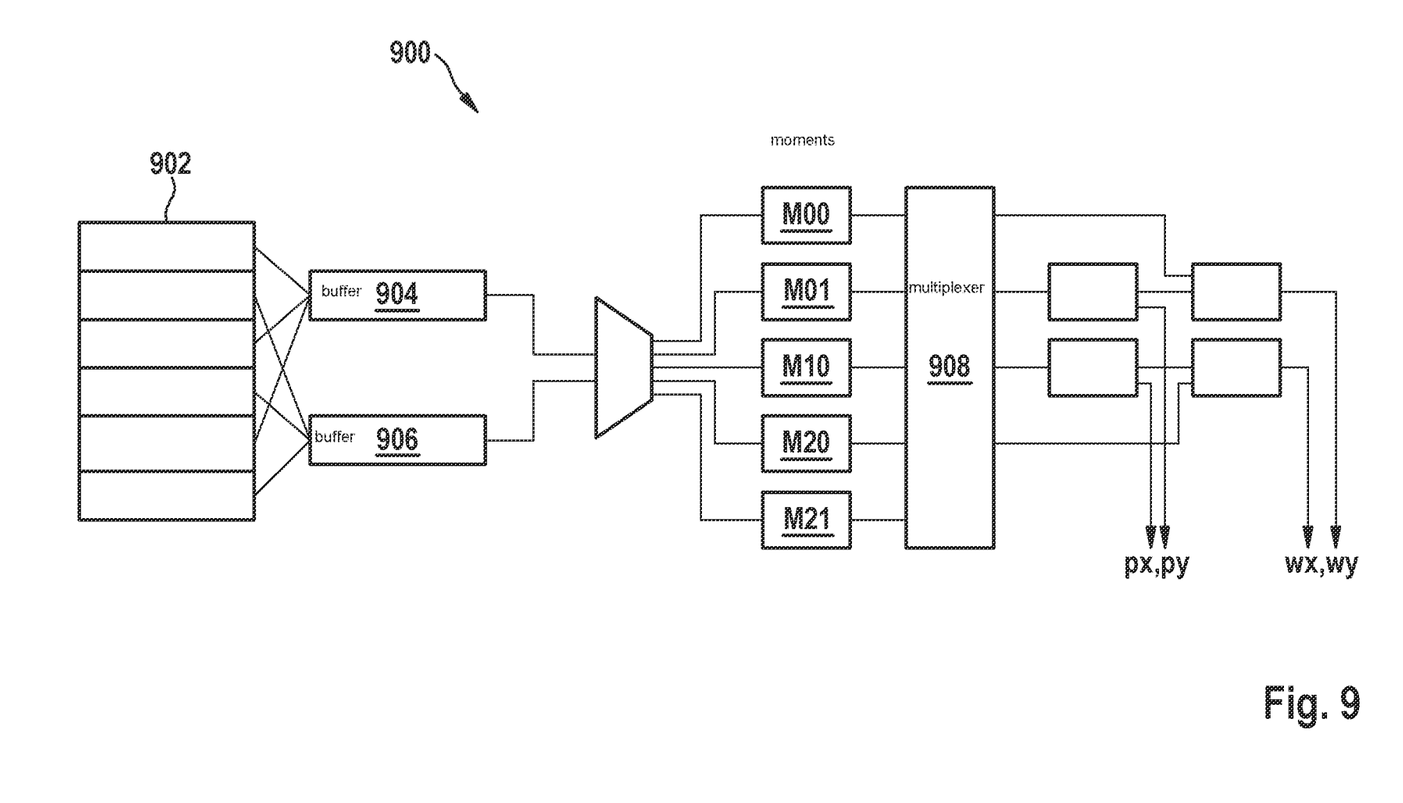
FIG. 9 schematically shows a representation of one exemplary embodiment of the present invention of a digital logic.

FIG. 9 schematically shows a representation of one exemplary embodiment of a digital logic 900 as it has been mentioned, for example, in FIG. 8. In a row-by-row scanning of the eye, the position of the pupil px, py and the expansion of the pupil in the x- and y-direction wx, wy is determined, for example, already during the image recording. For this purpose, the scanned rows (902) of image 500 are alternatingly written according to even and odd rows in buffers 904, 906 and corresponding image moments M00 through M21 are subsequently summed and multiplied in reverse order according to the equation cited in FIG. 7. In the process, the result of the preceding row is always carried along. If the last row of the image recording is reached, the accumulated moments of image 500 are subsequently forwarded via a multiplexer 908 for calculating the pupil position and the moments. In this way, the memory requirement needed for the image memory for an M×N image is reduced to M×2.

Since aberrations are still included even after the image preprocessing, an offset between the true pupil midpoint and the pupil midpoint estimated from the data may result. This is attributable essentially to aberrations in the 2D image, which are caused, for example, by contaminations of the glass lens or of the MEMS mirror. Strong reflexes are also possible as a result of the moistening of the eye with lacrimal fluid, which also result in a strong reflection of the light and thus in high amplitudes in the optical power of the laser. Since this does not correlate with the position of the pupil and does not correspond to the Gaussian distribution, they must be suppressed accordingly in order to increase accuracies of the function fitting.

A morphological filter, for example, which suppresses individual pixels, is used for this suppression. Furthermore, the affiliation of the pupil is ascertainable via the distance to the estimated center of the pupil. In this case, the probability decreases quadratically with the Euclidean distance to the estimated center ($1/r^2$) and the pixels that are further away are multiplied by this quadratic penalty term and thus suppressed.

In order to further reduce the power consumption, further model knowledge may be called upon for optimizing the pupil detection, as it is described, for example, in the following FIG. 10.

Figure 10:
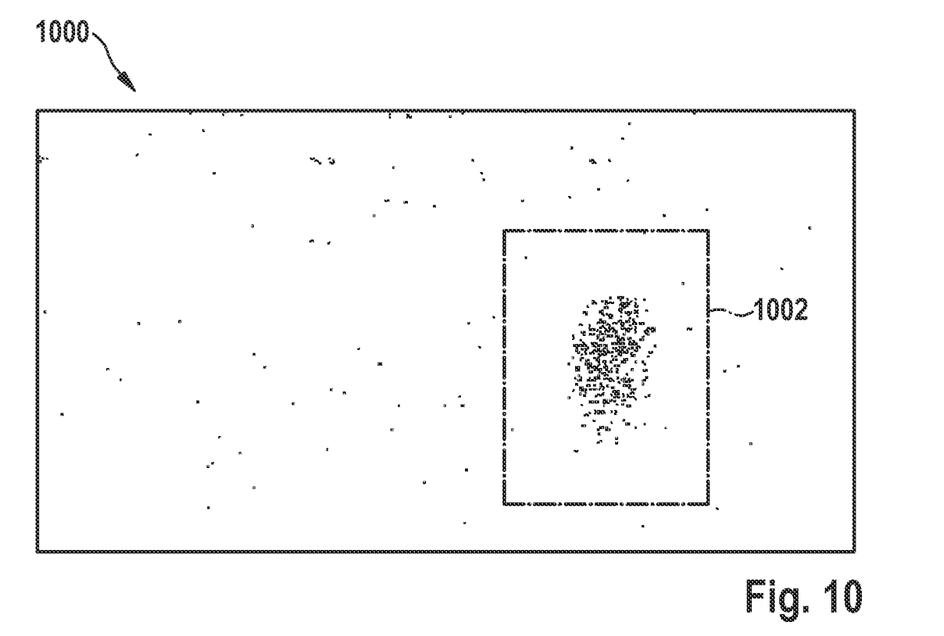
FIG. 10 schematically shows a representation of one exemplary embodiment of the present invention of a generated image.

FIG. 10 schematically shows a representation of one exemplary embodiment of a generated image 500. Image 500 is similar, for example, to the image described in one of FIGS. 5, 7, 8, 9. According to this exemplary embodiment, merely the use of the model knowledge about the pupil and the structure of image 500 during the scanning process is represented. In this case, a sub-image 1002 is ascertained based on the last pupil position px, py and the last pupil diameter for limiting the search space in image 500 and the associated number of additions and multiplications for determining the pupil diameter.

Sub-image 1002 is selected in this case in such a way that the center of the last detected pupil is situated in the center of sub-image 1002 and includes the expansion of the pupil and an additional offset, for example, for taking a tolerance range into account. The aim of the additional offset is for the complete pupil to be captured by sub-image 1002, even if the pupil has moved between the images. The tracking of this sub-image 1002 may be implemented based on the velocity of the eye, as is described in FIG. 11.

Figure 11:
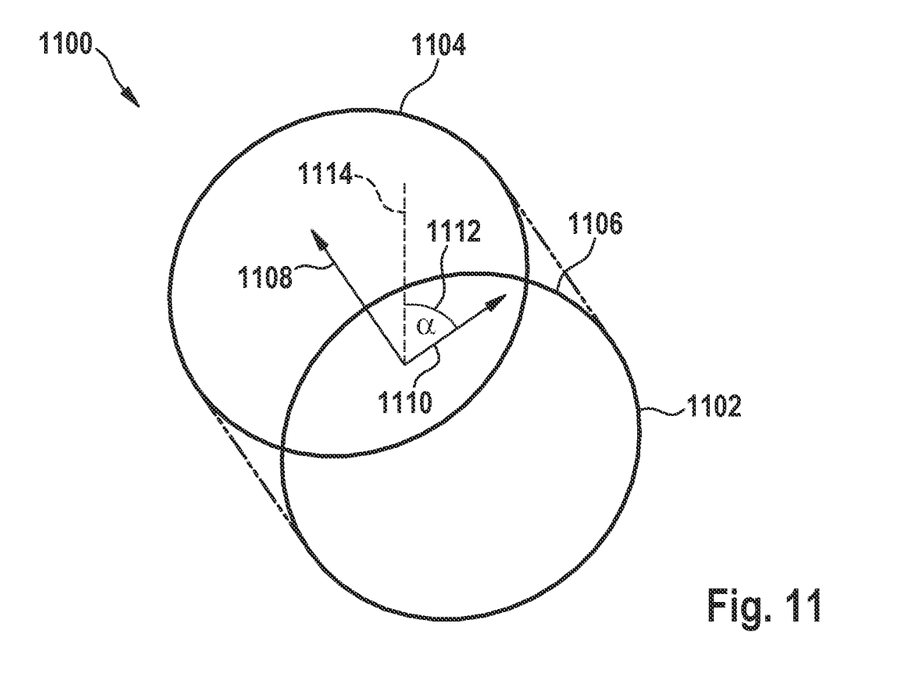
FIG. 11 schematically shows a representation of one exemplary embodiment of the present invention of an image.

FIG. 11 schematically shows a representation of one exemplary embodiment of an image 500. Image 500 is similar, for example, to image 500 described in FIG. 10, according to this exemplary embodiment, image 500 showing a map of the eye, more precisely, of a pupil 1102, which has moved from an initial eye position 1104 to a final eye position 1106. Thus, according to this exemplary embodiment, an effect of an elliptical distortion of pupil 1102 is represented, which has occurred as a result of the eye movement during the row-by-row image recording. This further results in a deformation of the main axes of the Gaussian function, which is preferably used for describing the pupil function.

In other words, pupil 1102 moves from initial position 1104 to final position 1106, which is reached when the image recording is completed, while two-dimensional image 500 is being recorded. This results in a distortion of pupil 1102 in a final image. In order to determine a velocity from the pupil distortions, main axes 1108, 1110 of a resulting ellipsis are initially determined from a covariance matrix. Furthermore, according to one exemplary embodiment, an angle 1112 between image normals 1114 and main axes 1108, 1110 of the distribution is determined. From this, it is possible to determine a direction and velocity of the movement of pupil 1102. According to one exemplary embodiment, the velocity direction and the amplitude of the velocity are determined based on the ratio between the amplitudes and of angle 1112. With this additional piece of information, a velocity-based selection of a sub-image may be implemented on the one hand, and furthermore, a system latency thereover, for example, for the image projection is reducible.

Figure 12:
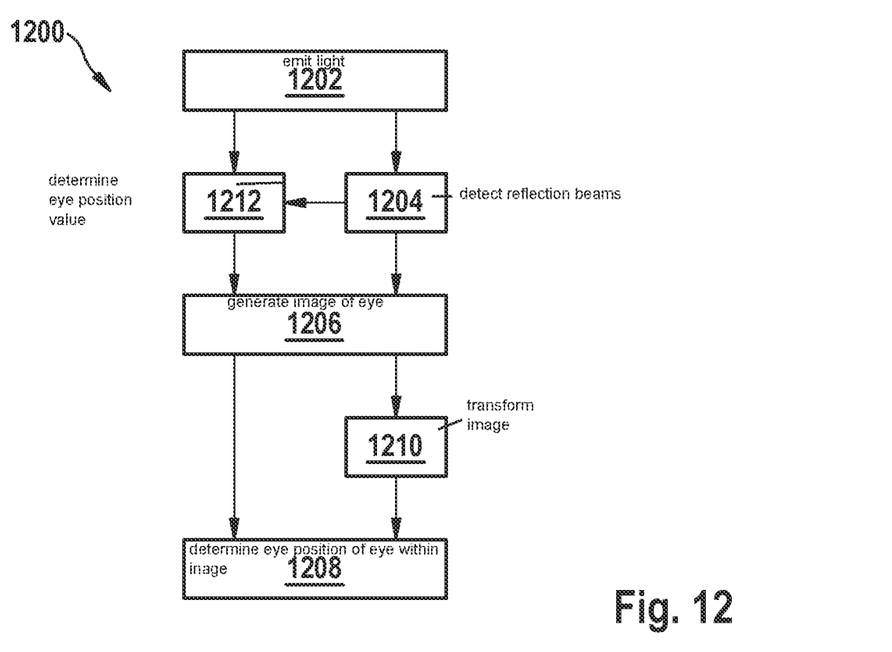
FIG. 12 shows a flowchart of one exemplary embodiment of a method for determining an eye position using a laser device, according to the present invention.

FIG. 12 shows a flowchart of one exemplary embodiment of a method 1200 for determining an eye position using a laser device. Method 1200 is applied in this case as it has been described, for example, in FIG. 1. Method 1200 includes for this purpose a step 1202 of emitting, a step 1204 of detecting, a step 1206 of generating, and a step 1208 of determining. In step 1202 of emitting, light for scanning an eye is emitted along at least one scan line. In step 1204 of detection, a plurality of reflection beams of the light reflected at the eye along the scan line are then detected in order to obtain a plurality of light intensity values, the light intensity values representing intensities of the reflection beams reflected along the scan line. In step 1206 of generating, an image of the eye is generated along the scan line using the light intensity values, a high light intensity value being assigned or being assignable to a reflection beam reflected at the retina of the eye and a light intensity value low in comparison to the high light intensity value being assigned or being assignable to a reflection beam reflected outside the retina of the eye. In step 1208 of determining, the eye position of the eye within the image, this means, for example, a pupil center and/or a pupil size, is determined using amplitudes of the light intensity values.

Method 1200 merely optionally includes a step 1210 of transforming the image using a function in order to obtain a transformed image with transformed light intensity values. The eye position is then determined using amplitudes of the transformed light intensity values. For this purpose, a Gaussian function, step function or a rectangular function is further optionally carried out.

According to this exemplary embodiment, the light for scanning the eye is output in step 1202 of outputting along the scan line that represents a row of the image generated in step 1206 of generating. Simply put, the light is output row-by-row. The light is also optionally emitted along a plurality of scan lines, so that in step 1204 of detecting, the plurality of reflection beams of the light reflected along the plurality of scan lines is detected in order to obtain the plurality of light intensity values. The light intensity values in this case represent intensities of the reflection beams reflected along the plurality of scan lines. This means that in step 1206 of generating, the image is thus generated as a two-dimensional map of the eye along the plurality of scan lines using the light intensity values, and that in step 1208 of determining, the eye position of the eye within the image is determined using amplitudes of the light intensity values, giving a recipient the impression of a simultaneous detection and calculation.

Alternatively, the light is emitted in step 1202 of emitting along a single scan line, so that in an optional step 1212 of predetermining, an eye position value of the eye within the image is determined using amplitudes of the light intensity values. Steps 1202, 1204, 1206, 1208, 1210, 1212 of method 1200 are carried out repeatedly for further scan lines in order to predetermine, for example, row-by-row, further eye position values. In step 1208 of determining, the eye position of the eye is determined using the plurality of eye position values, which is referred to, for example, as iterative fitting. In step 1206 of generating, the image is further optionally generated as a sub-image along a section of the scan line, the section being defined using a previously determined eye position. This means that steps 1202, 1204, 1206, 1208, 1210, 1212 of method 1200 may, for example, be carried out or are carried out repeatedly.

In step 1208 of determining, individual image moments are determined according to this exemplary embodiment using the light intensity values, an image focal point of the image is determined from the image moments, and a position of a pupil center of a pupil of the eye is determined as the eye position from the image focal point. Furthermore, a covariance matrix of the image is optionally determined in step 1208 of determining from the image moments and a pupil size of the pupil is determined, for example, calculated, from the covariance matrix. Thereafter, it is merely optional to also determine in step 1208 of determining a quality of the determination of the eye position using the covariance matrix.

On the whole, this may be a method 1200, which is implementable by one of the devices described with reference to the preceding figures or by which images are generated or changed, as they have been described in detail in the preceding figures.

Figure 13:
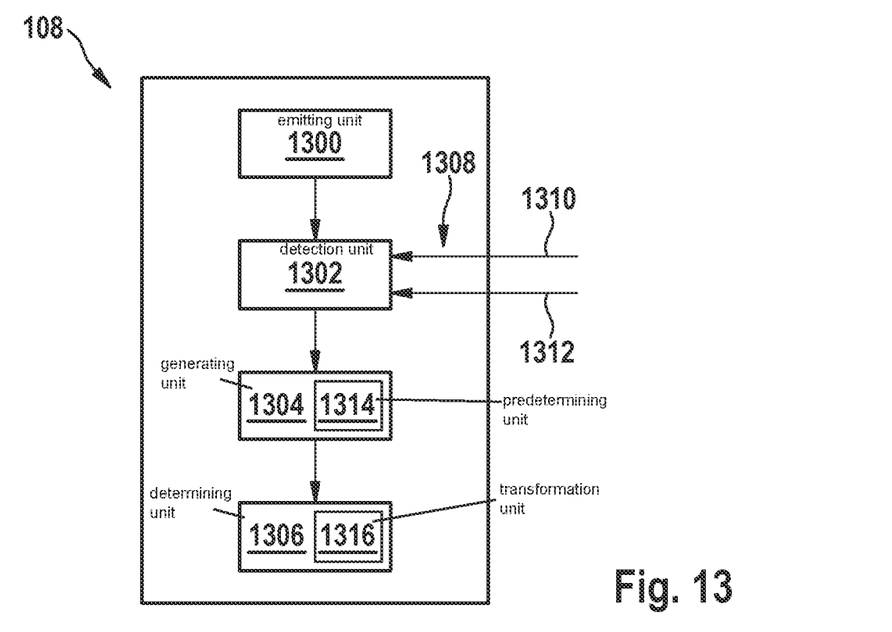
FIG. 13 shows a block diagram of a device according to one exemplary embodiment of the present invention.

FIG. 13 shows a block diagram of a device 108 according to one exemplary embodiment. Device 108 described here corresponds, for example, to device 108 described in FIG. 1 and is accordingly implemented or implementable as part of a laser device as it has been described as part of a set of smart glasses in FIG. 1. Device 108 includes merely optionally a digital logic, as it has been represented and described by way of example in FIG. 9 for carrying out the method as it has been described in FIG. 12.

Device 108, however, includes at least one emitting unit 1300, one detection unit 1302, one generating unit 1304 and one determining unit 1306. Emitting unit 1300 in this case is designed to trigger an emission of light for scanning an eye along at least one scan line. Detection unit 1302 is designed to obtain a plurality of light intensity values 1308 of reflection beams of the light reflected and detected at the eye along the scan line, the light intensity values 1308 representing intensities of the reflection beams reflected along the scan line. Generating unit 1304 is designed to generate an image of the eye along the scan line using light intensity values 1308, a high light intensity value 1310 being assigned or being assignable to a reflection beam reflected at the retina of the eye and a light intensity value 1312 low in comparison to high light intensity value 1310 being assigned or being assignable to a reflection beam reflected outside the retina of the eye. Determining unit 1306 is designed to determine the eye position of the eye within the image using amplitudes of light intensity values 1308, 1310, 1312.

The optional step of predetermining described in FIG. 12 is implementable, for example, in generating unit 1304. Alternatively, it is possible that device 108 includes a separate predetermining unit 1314 for exactly this purpose. This is also the case with the step of transforming described in FIG. 12, which is implementable, for example, in determining unit 1306 before the determination of the eye position. Alternatively and merely optionally, device 108 includes a transformation unit 1316 intended specifically for this purpose.

What is claimed is:

1. A method for determining an eye position of an eye using a laser device for a set of smart glasses, the method comprising:

emitting light for scanning the eye along at least one scan line;

detecting a plurality of reflection beams of light reflected at the eye along the scan line to obtain a plurality of light intensity values, the light intensity values representing intensities of the reflection beams reflected along the scan line;

generating an image of the eye along the scan line using the light intensity values, a high light intensity value being assigned or being assignable to a reflection beam reflected at a retina of the eye and a light intensity value low in comparison to the high light intensity value being assigned or being assignable to a reflection beam reflected outside the retina of the eye; and determining the eye position of the eye within the image using amplitudes of the light intensity values;

wherein in the determining, a covariant matrix of the image is determined from image moments, and wherein each of the image moments is a weighted average of the light intensity values assigned to image points or image pixels.

2. The method as recited in claim 1, wherein in the step of emitting, the light for scanning the eye is output along the scan line, which represents a row of the image generated in the step of generating.

3. The method as recited in claim 1, further comprising:

transforming the image using a function to obtain a transformed image with transformed light intensity values;

wherein in the step of determining, the eye position is determined using amplitudes of the transformed light intensity values.

4. The method as recited in claim 3, wherein the step of transforming is carried out using a Gaussian function, or a step function, or a rectangular function.

5. The method as recited in claim 1, wherein in the step of emitting, the light is emitted along a plurality of scan lines, in the step of detecting, the plurality of reflection beams of light reflected at the eye along the plurality of scan lines being detected to obtain the plurality of light intensity values, the light intensity values representing intensities of the reflection beams reflected along the plurality of scan lines, in the step of generating, the image is generated as a two-dimensional map of the eye along the plurality of scan lines using the light intensity values, and in the step of determining, the eye position of the eye within the image is determined using amplitudes of the light intensity values.

6. The method as recited in claim 1, wherein in the step of emitting, the light is emitted along a single scan line, in a step of predetermining, an eye position value of the eye within the image is determined using amplitudes of the light intensity values, and wherein the steps of the method are carried out repeatedly for further scan lines to predetermine further eye position values, and in the step of determining, the eye position of the eye is determined using the plurality of eye position values.

7. The method as recited in claim 1, wherein in the step of determining, an image focal point of the image is determined from the image moments, and a position of a pupil center of a pupil of the eye is determined as the eye position from the image focal point.

8. The method as recited in claim 7, wherein pupil size of the pupil is determined from the covariant matrix.

9. The method as recited in claim 8, wherein in the step of determining, a quality of the determination of the eye position is determined using the covariant matrix.

10. The method as recited in claim 8, wherein in the step of determining, a movement of the pupil is determined using the covariant matrix.

11. The method as recited in claim 1, wherein in the step of generating, the image is generated as a sub-image along a section of the scan line, the section being defined using a previously determined eye position.

12. The method as recited in claim 1, wherein in the step of detecting, the reflected reflection beams of light are detected using a sensor, which is situated in an axis of the light emitted in the step of emitting or is folded into the axis.

13. An apparatus to determine an eye position of an eye using a laser device for a set of smart glasses, comprising:
a device configured to perform the following:
   emitting light for scanning the eye along at least one scan line;
   detecting a plurality of reflection beams of light reflected at the eye along the scan line to obtain a plurality of light intensity values, the light intensity values representing intensities of the reflection beams reflected along the scan line;
   generating an image of the eye along the scan line using the light intensity values, a high light intensity value being assigned or being assignable to a reflection beam reflected at a retina of the eye and a light intensity value low in comparison to the high light intensity value being assigned or being assignable to a reflection beam reflected outside the retina of the eye; and
   determining the eye position of the eye within the image using amplitudes of the light intensity values;
   wherein in the determining, a covariant matrix of the image is determined from image moments, and wherein each of the image moments is a weighted average of the light intensity values assigned to image points or image pixels.

14. A non-transitory computer-readable medium on which is stored a computer program, comprising:
a program code arrangement having program code for determining an eye position of an eye using a laser device for a set of smart glasses, by performing the following:
   emitting light for scanning the eye along at least one scan line;
   detecting a plurality of reflection beams of light reflected at the eye along the scan line to obtain a plurality of light intensity values, the light intensity values representing intensities of the reflection beams reflected along the scan line;
   generating an image of the eye along the scan line using the light intensity values, a high light intensity value being assigned or being assignable to a reflection beam reflected at a retina of the eye and a light intensity value low in comparison to the high light intensity value being assigned or being assignable to a reflection beam reflected outside the retina of the eye; and
   determining the eye position of the eye within the image using amplitudes of the light intensity values;
   wherein in the determining, a covariant matrix of the image is determined from image moments, and wherein each of the image moments is a weighted average of the light intensity values assigned to image points or image pixels.

15. A laser device for a set of smart glasses, comprising:
a light source configured to emit light for scanning an eye along at least one scan line;
a sensor configured to detect a plurality of reflection beams of the light reflected at the eye along the scan line to obtain a plurality of light intensity values, the light intensity values representing intensities of the reflection beams reflected along the scan line to generate an image of the eye along the scan line using the light intensity values, a high light intensity value being assigned or being assignable to a reflection beam reflected at the retina of the eye and a light intensity value low in comparison to the high light intensity value being assigned or being assignable to a reflection beam reflected outside the retina of the eye; and
a device configured to perform the following:
   generating an image of the eye along the scan line using the light intensity values; and
   determining the eye position of the eye within the image using amplitudes of the light intensity values;
   wherein in the determining, a covariant matrix of the image is determined from image moments, and wherein each of the image moments is a weighted average of the light intensity values assigned to image points or image pixels.

* * * * *